Oct. 14, 1941.          H. WAGNER ET AL          2,258,724
FIXATION OF WINDOW PANES IN AIRCRAFT
Filed April 25, 1938
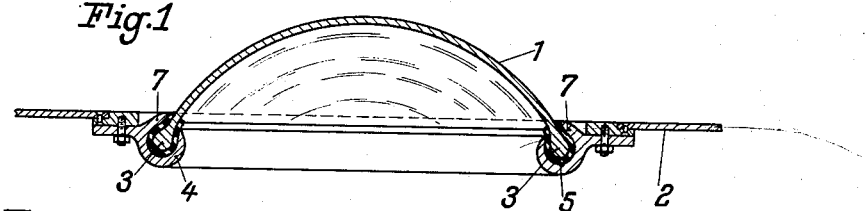
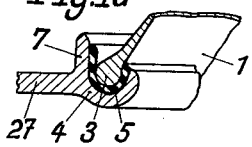
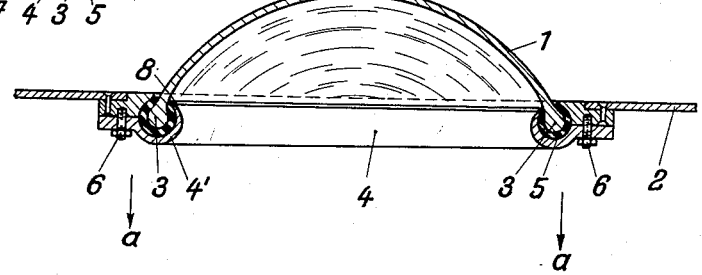
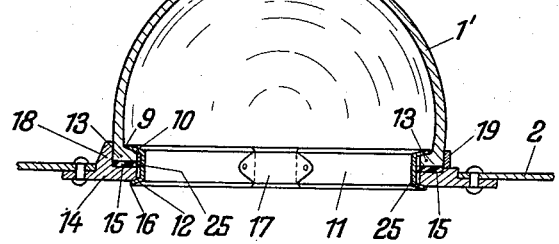
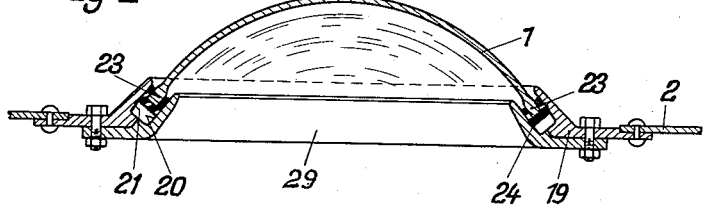

Patented Oct. 14, 1941

2,258,724

UNITED STATES PATENT OFFICE 2,258,724

FIXATION OF WINDOW PANES IN AIRCRAFT

Herbert Wagner, Berlin-Schmargendorf, and Justus Muttray and Ludwig Wagenseil, Dessau, Germany, assignors to Junkers Flugzeug-und-Motorenwerke Aktiengesellschaft, Dessau, Germany Application April 25, 1938, Serial No. 204,218
In Germany May 7, 1937

7 Claims. (Cl. 20—40)

This invention relates to transparent panes serving to close apertures in the walls of vehicles and more especially aircraft. It has particular reference to vaulted window panes mounted in perforations of the walls enclosing aircraft compartments acted upon by a high inner pressure, such as are provided in high altitude aircraft.

As is well known to those skilled in the art, panes of this kind must be mounted in place in such manner that the connection between the pane and the wall can withstand the stresses exerted on it by the pressure above normal prevailing in the compartment and that the connection between the pane and the wall is leakproof and does not allow the air to escape. However since such panes consist as a rule of a material altogether differing from the material constituting the walls of such compartments, the dimensions of these panes change differently, under the influence of temperature changes, from those of the compartment walls. For instance if the panes consist of transparent artificial resin, their expansion under the influence of temperature rises is considerably greater than that of the walls of the high altitude compartment, which as a rule consist of a light metal. If the connection of such pane with the wall is unyielding, this connection is not only acted upon by the forces resulting from the pressure above normal within the compartment, but also by forces arising in consequence of the difference in expansion and contraction of the panes on the one hand and the walls on the other hand. Consequently this connection must be so chosen as to be able to withstand comparatively great forces.

Hitherto the vaulted window panes have been connected with the wall in such manner that the means of fixation traverse the transparent pane, which was of uniform thickness throughout. The perforations of the pane required by this mode of fixation act towards weakening it at the very places where the pane is subjected to the highest stresses and the local stresses arising thereby are likely to lead to a destruction of the pane.

It is one of the objects of this invention to provide a connection between the vaulted pane and the wall of an altitude compartment in aircraft, which, while being able to withstand the action of the forces mentioned above, is substantially not acted upon by higher local stresses, which might lead to destruction. We attain this according to this invention by forming the marginal portion of the pane with a beaded edge, which may for instance be pear-shaped in cross-section and which is gripped by the fixation means in such manner as to be fixed in place relative to the wall without any friction. By thus designing the pane we are not required to perforate and thereby weaken it. Apart therefrom the beaded edge considerably reinforces the pane in those places which are required to withstand the highest stresses.

In order to obtain the best possible distribution of stresses in the pane body, we prefer to form the pane body with a thickness gradually increasing towards the marginal portion. In order to further avoid as far as possible higher stresses in view of the changes of dimensions arising in consequence of variations of temperature, we insert between the bead-shaped enlargement of the pane and the fixation members an elastic insert which enables the pane to move relative to these members and at the same time serves as a pressure-proof packing.

We may also design the connection in such manner that the fixation members grip the beaded edge of the pane on one side only, preferably on the inner side. In order to prevent a loosening of this connection in spite of the one sidedly acting fixation, there is arranged on the side of the bead averted from the fixation members a rigid abutment or tensioning member, which closely applies itself to the beaded edge and prevents it from giving way.

In window panes vaulted after the manner of a cupola and formed with a circular beaded edge, the vaulted surface of which intersects the plane of the beaded edge portion at an acute angle, the fixation members may form two parallel annular surfaces also extending at an acute angle towards the plane of the marginal portion, between which the bead is held for displacement. In a window connection thus designed the portion adjoining the annular surfaces (a packing insert being preferably arranged between them) is able to shift in the direction of the conical frustum, when the pane suffers a change of dimensions under the influence of changes of temperature. We thus prevent the pane from being subjected to material bending stresses under the influence of changes of temperature.

In the drawing affixed to this specification and forming part thereof four embodiments of our invention are illustrated diagrammatically by way of example.

In the drawing:

Figs. 1 to 4 are axial cross-sections of the four embodiments, while

Fig. 1a illustrates the mode, in which the pane is gripped by and fixed in position in the fixation member.

Referring to the drawing and first to Fig. 1, 1 is a dome-shaped concavo-convex transparent window pane and 2 is the outer wall of an altitude compartment of an aircraft filled with air under pressure above normal. The edge portion of the pane 1 forms a bead 3 and the wall thickness of the pane gradually increases in the marginal portion adjoining the bead 3. The fixation member 4 grips this beaded portion after the manner of a jaw, so that all perforations of the pane are avoided.

In the embodiments shown in Figs. 1 and 2 the beaded edge projects on both sides beyond the planes which delimit the adjoining part of the pane and is gripped on both sides of this part by the holding members formed by a frame-like setting 4 and 4'; respectively, which jaw-like embraces the bead 3. Between the bead and the frame is inserted an elastic layer 5 which forms a pressure-proof seal and affords a limited mobility for the pane relative to the holding members.

In the embodiment shown in Figs. 1 and 1a a single holding member having the form of a frame is provided, which, before the pane 1 is mounted in place, has an opening sufficing to insert the bead, one edge portion 7 of the frame extending at first at right angles to the annular flange 27. After the elastic insert 5 and the beaded edge portion 3 of the pane have been placed into the frame 4, the part 7 is forced down upon the bead as shown in Fig. 1.

In the embodiment of Fig. 2 the holding member consists of two parts divided in a plane extending through the center points of the beaded edge portion of the pane and consisting of a frame and a clamping means 4, so that after withdrawal of the screws 6 the clamping means 4' of the holding member can be lifted off in the direction of the arrows a. Even if the hemispherical part 4' should extend so far into the hollow of the pane, that the inner edge 8 projects somewhat around the bead 3, withdrawal of this part of the holding member is still rendered possible owing to the elasticity of the insert 5.

In the embodiment of Fig. 3 the bead projects only to one side (the inner side) of the wall of the pane 1' which is here formed as a hemisphere. Against the projecting shoulder 9 of the bead 13 a circumferential flange 10 of an inner annular fastening member or clamping means 11 is applied, the other flange 12 of which applies itself to a shoulder 16 of the frame 14 fixed to the wall 2 of the compartment. The shoulder surfaces 9 and 16 as well as the flange surfaces 10 and 12 adjoining them extend at an angle to each other. If the split ring 11 is expanded, the edge-like action of the angularly extending surfaces will press the end face 15 of the beaded edge 13 of the pane against the frame 14. Between the two parts is inserted an elastic packing ring 25. In order to prevent loosening of the connection between the wall 2 and the pane 1', the outer surface of the beaded edge 13 may be applied against the inner surface of a rigid flange 18 of the frame 14 (left hand side of Fig. 3) or against the inside of a separate outer ring 19 (right hand side of Fig. 3). The flange 18 as well as the ring 19 prevent the pane 1' from yielding in radial direction and getting loose. In order to be able to contract the connecting ring 11 for the purpose of withdrawing, and to expand it when mounting the pane in place, this ring may be made in two parts, a main part 11 and an insert 17 which is forced in between the ends of the split ring 11 and fixed to it.

The beaded edge 13 and the ring 11 might also be arranged on the outside, the flange 18 or the ring 19 on the inside of the pane 1.

In the embodiment of Fig. 4 the beaded edge 23, which projects on both sides beyond the vaulted pane, is held in position on the wall 2 by means of a frame or setting 19 and ring or clamping means 29, the adjoining faces of which, 20 and 21, form the parallel surfaces of a conical frustum and extend substantially in the same direction as the marginal portion of the pane 1. Between these conical faces is arranged the bead 23, a packing ring 24 being inserted between the parts and preferably fixed to the bead 23. If the pane 1 undergoes a change of dimensions relative to the frame 19, 29, the beaded edge portion 23 is free to displace itself accordingly relative to the conical frusta so that such changes of dimensions cannot bring forth any material bending stresses.

We wish it to be understood that we do not desire to be limited to the exact details of construction shown and described for obvious modifications will occur to a person skilled in the art.

We claim:

1. A window mounting for airplanes comprising a concavo-convex pane adapted to withstand the stresses exerted by the difference in air pressure inside and outside an airplane cabin at high altitudes, an integral annular reinforcing bead around the plane periphery to receive said stresses, the inner and outer sides of the peripheral margin of the pane being parallel, the pane in cross section having its margins outwardly inclined from one another, an apertured cabin wall, and cooperating holding means thereon having spaced, parallel contacting faces engaging opposite sides of the pane adjacent its periphery whereby movement of the pane due to contraction or expansion is permitted between said contacting faces.

2. A window mounting for airplanes comprising a concavo-convex pane adapted to withstand the stresses exerted by the difference in air pressure inside and outside an airplane cabin at high altitudes, the concave face of the plane being inward, an integral annular reinforcing bead formed around the pane periphery to receive said stresses, the inner and outer sides of the annular margin of the pane being parallel and the pane in cross section having its margins outwardly inclined from one another, and an apertured cabin wall, in combination with a holding means including a frame mounted on said wall and extending around the aperture, said frame having an annular face which is transversely inclined and parallel with the outer side of the pane adjacent its periphery which bears thereon, and clamping means mounted on said frame having a substantially annular face parallel with and bearing against the inner side of the pane adjacent its periphery whereby movement of the pane due to contraction and expansion is permitted between the faces of the frame and clamping means.

3. A transparent section for a wall having an opening therein and adapted to withstand stresses set up by substantial pressure and temperature differentials on opposite sides thereof comprising a concavo-convex pane terminating in an integral annular peripheral reinforcing bead substantially thicker than the pane, and an annular channel-like pane-supporting seat rigid with the wall and opening in a direction substantially tangent to the pane at its periphery, said bead being positioned within said seat.

4. The arrangement set forth in claim 3 wherein an elastic packing means is interposed between the bead and the adjacent supporting surface of the seat.

5. The arrangement set forth in claim 3 wherein the thickness of the pane increases gradually toward the beaded peripheral edge thereof.

6. The arrangement set forth in claim 3 wherein the seat comprises jawlike portions for gripping the peripheral bead of said pane.

7. The arrangement set forth in claim 3 wherein said seat is a composite assembly at least one part of which is rigidly secured to the wall surrounding said opening.

HERBERT WAGNER.
JUSTUS MUTTRAY.
LUDWIG WAGENSEIL.